US011212706B2

(12) United States Patent
Li et al.

(10) Patent No.: US 11,212,706 B2
(45) Date of Patent: *Dec. 28, 2021

(54) FLOW LEVEL PACING BY CONTROLLING SOCKET SEND BUFFER SIZE (71) Applicant: Verizon Patent and Licensing Inc., Washington, DC (US)

(72) Inventors: Feng Li, Lexington, MA (US); Jae Won Chung, Lexington, MA (US); Haim Ner, Fair Lawn, NJ (US); Bjorn Olof Erland Kalderen, South Orange, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 60 days.

This patent is subject to a terminal disclaimer.

(21) Appl. No.: 16/825,453

(22) Filed: Mar. 20, 2020

(65) Prior Publication Data

US 2020/0221345 A1 Jul. 9, 2020

Related U.S. Application Data

(63) Continuation of application No. 16/010,824, filed on Jun. 18, 2018, now Pat. No. 10,638,366.

(51) Int. Cl.
*H04W 28/10* (2009.01)
*H04L 12/26* (2006.01)
*H04L 12/825* (2013.01)
*H04W 28/02* (2009.01)
*H04L 12/835* (2013.01)

(52) U.S. Cl.
CPC ......... *H04W 28/10* (2013.01); *H04L 43/0864* (2013.01); *H04L 47/25* (2013.01); *H04L 47/30* (2013.01); *H04W 28/0236* (2013.01); *H04W 28/0268* (2013.01); *H04W 28/0273* (2013.01)

(58) Field of Classification Search
None
See application file for complete search history.

(56) References Cited

U.S. PATENT DOCUMENTS

| 7,054,317 | B1 * | 5/2006 | Jung | H04L 47/20 370/395.1 |
| 2003/0005187 | A1 * | 1/2003 | King-Smith | H04L 12/56 710/12 |
| 2005/0226272 | A1 * | 10/2005 | Luby | H04L 69/16 370/473 |

(Continued)

*Primary Examiner* — Hong S Cho (57) ABSTRACT

A computing device may include a memory configured to store instructions and a processor configured to execute the instructions to identify a data connection from an application server device to a user equipment (UE) device, wherein the UE device is connected to the network via a wireless connection; determine a target sending rate for the data connection; determine a round trip time for packets associated with the data connection; and calculate a send buffer size for the data connection based on the determined target sending rate and the determined round trip time. The processor may be further configured to set a send buffer size for a socket associated with the data connection to the calculated send buffer size and control a send rate from the application server device to the UE device for the data connection using the set send buffer size for the socket.

20 Claims, 8 Drawing Sheets

(56) References Cited

U.S. PATENT DOCUMENTS

| | | | |
|---|---|---|---|
| 2008/0192724 A1* | 8/2008 | Kondo | H04W 28/0252 370/345 |
| 2008/0232378 A1* | 9/2008 | Moorthy | H04L 69/12 370/395.52 |
| 2010/0042739 A1* | 2/2010 | Clarke | H04L 47/19 709/230 |
| 2010/0250678 A1* | 9/2010 | Hu | H04N 21/632 709/204 |
| 2013/0148507 A1* | 6/2013 | Wen | H04W 40/22 370/237 |
| 2014/0226658 A1* | 8/2014 | Kakadia | H04L 43/0876 370/389 |
| 2016/0269507 A1* | 9/2016 | Kumar | H04L 67/1097 |

* cited by examiner

FLOW LEVEL PACING BY CONTROLLING SOCKET SEND BUFFER SIZE

CROSS REFERENCE TO RELATED APPLICATIONS

This patent application is a continuation of U.S. patent application Ser. No. 16/010,824, filed on Jun. 18, 2018, the contents of which are hereby incorporated by reference in their entirety.

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage a large number of devices. In order to maintain a quality of service across a network, or across multiple networks, the provider may need to manage the flow of data to wireless communication devices.

DETAILED DESCRIPTION OF PREFERRED EMBODIMENTS

The following detailed description refers to the accompanying drawings. The same reference numbers in different drawings identify the same or similar elements.

As the data traffic and number of user equipment (UE) devices using wireless access networks increase, the number of different types of UE devices and the number of different types of data also increase. The continually increasing wireless traffic may result in congestion in base stations. One way to reduce congestion in base stations may include application detection and control (ADC) that performs traffic analysis and classifies traffic flows based on applications and/or traffic type. The ADC information may then be used to reduce data throughput for particular applications and/or traffic type. However, ADC may introduce a higher packet drop rate. For example, ADC traffic control for streaming video may result in a 10-12% retransmission ratio. A high number of retransmission may reduce the efficiency of a network by increasing the number of packets being sent via a particular data flow.

Implementations described herein relate to dynamically pacing the send rate of a data flow by an application server to a user equipment (UE) device. The send rate of the application data may be controlled by setting the size of the send buffer of a socket associated with the data flow. A network device in a network may be configured to identify a data connection from an application server device to UE device that is connected to the network via a wireless connection; determine a target sending rate for the data connection; determine a round trip time for packets associated with the data connection; and calculate a send buffer size for the data connection based on the determined target sending rate and the determined round trip time. The network device may then set a send buffer size for a socket associated with the data connection to the calculated send buffer size and control a send rate from the application server device to the UE device for the data connection using the set send buffer size for the socket.

For example, if the send buffer for the socket becomes full, the network device may signal back to the application server sending the data to the socket to reduce the window size in an acknowledgement packet sent back to the application server. In response, the application server may reduce the window size for the data flow. The window size determines the number of bytes that may be sent by the sender before an acknowledgement is received from the receiver. Thus, if the window size is reduced, the application server may reduce the send rate of the data flow.

Pacing the send flow of a data flow by controlling the socket send buffer size may lower the sending rate from an application server and therefore enable a base station to support more concurrent users; reduce a packet drop rate introduced by a traffic controller in the data path, such as an ADC controller or a token bucket filter (TBF) based rate controller; and/or control the flow rate of a data flow with accuracy without introducing an increase in packet dropping. Furthermore, controlling the socket send buffer size may be implemented without requiring changes in applications running on UE devices and/or application servers.

In some implementations, the socket may include a Linux kernel socket. In other implementations, a different type of socket may be used. In some implementations, a safety factor may be added to the round trip time to ensure the round trip time is not underestimated and/or to avoid setting a send buffer size that is too small if the round trip time estimation is not accurate.

Determining the target sending rate for the data connection may include determining an application type associated with the data connection and determining the target sending rate based on the determined application type. The data flow may include a Transmission Control Protocol (TCP) data flow, a User Datagram Protocol (UDP) data flow, a Quick UDP Internet Connections (QUIC) data flow, and/or a data flow associated with a different type of transport layer network protocol. Round trip time may easily be determined for TCP data flows, because TCP includes an acknowledgement mechanism in which the receiver sends acknowledgement packets to the sender. Thus, if the data connection uses a TCP data flow, determining the round trip time for the packets associated with the data connection may include accessing a round trip time counter for a TCP socket associated with the data connection. UDP does not have a built-in acknowledgement mechanism. Therefore, determining a round trip time for a UDP data flow may present challenges.

Implementations described herein relate to determining a round trip time for packets associated with a UDP data flow by estimating the round trip time using a request response cycle. For example, the network device may identify a request from a UE device in the data flow, determine a first time at which the request was received by the network device, identify a response from the application server to the identified request, determine a second time at which the response was received by the network device, and estimate the round trip time based on the difference between the first time and the second time.

In some implementations, the round trip time may be estimated based on an average round trip time that is determined based on a history of data connections for a base station associated with the UE device. For example, the network device may include database of base stations and, for each particular base station, may include a history of round trip times for data connections associated with the particular base station. The average round trip time may be different for different times of day, days of week, reported network conditions, reported air interface conditions associated with the particular base station, reported number of users associated with the particular base station, and/or other types of conditions. The network device may select an average round trip time from the database based on a current condition and use the selected average round trip time as the estimated round trip time for the data connection.

In some implementations, the network device configured to set the send buffer size for the data connection may be located in a packet data network (PDN) managed by a provider that provides communication services to the UE device and the network device may include a performance enhancement device (e.g., a middlebox) that improves the performance of the PDN and/or data flows in the PDN. In other implementations, the network device configured to set the send buffer size for the data connection may include a network device located in a wireless access network. For example, the network device may include a 4th Generation (4G) PDN Gateway (PGW), a Fifth Generation (5G) User Plane Function (UPF) device, and/or another type of wireless access network device.

Figure 1:
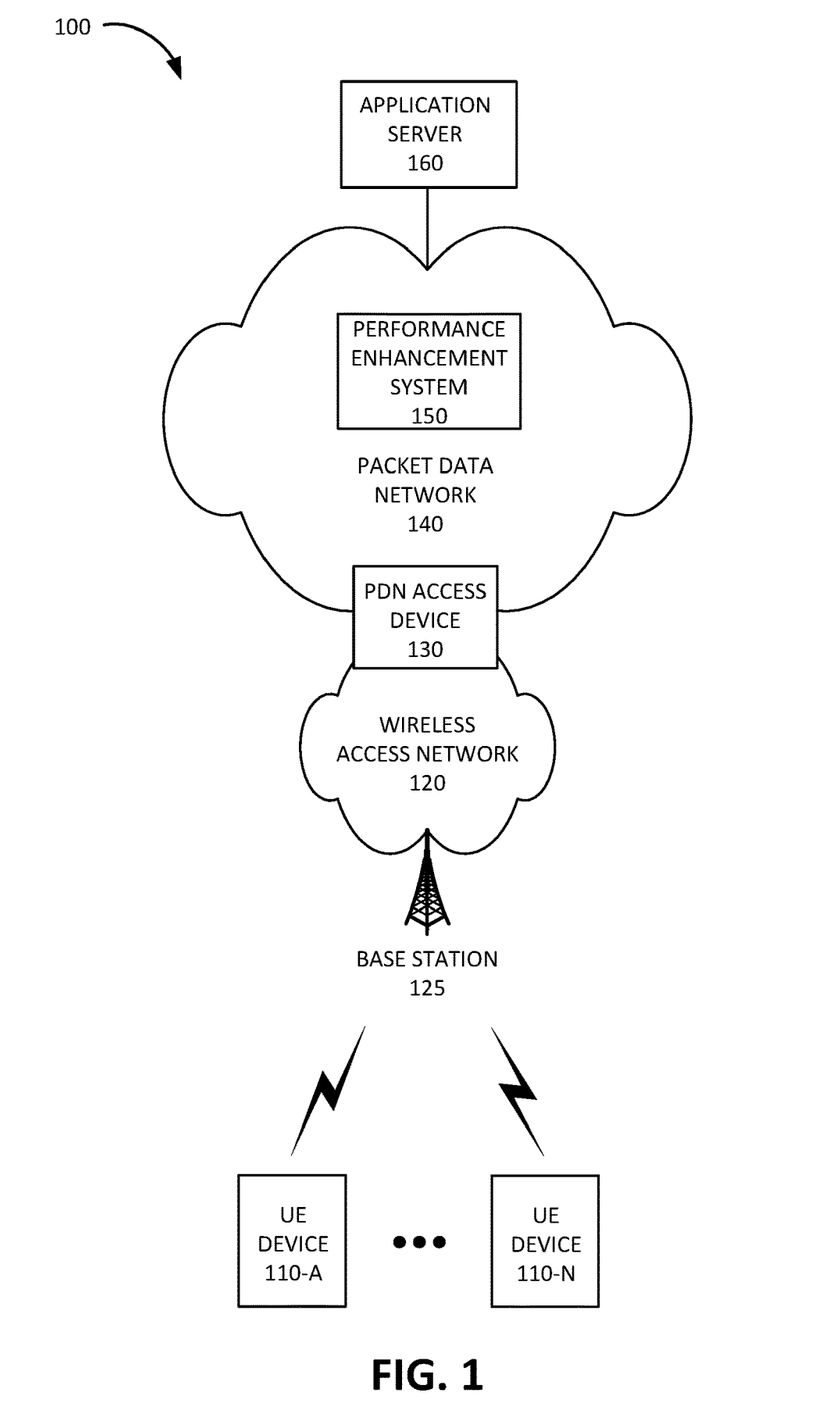
FIG. 1 is a diagram illustrating an environment according to an implementation described herein.

FIG. 1 is a diagram of an exemplary environment 100 in which the systems and/or methods, described herein, may be implemented. As shown in FIG. 1, environment 100 may include UE devices 110-A to 110-N (referred to collectively as "UE devices 110" and individually as "UE device 110"), a wireless access network 120, a packet data network 140, and an application server 160.

UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 110 may be used for voice communication, mobile broadband services (e.g., video streaming, real-time gaming, premium Internet access etc.), best effort data traffic, and/or other types of applications.

In other implementations, UE device 110 may include an embedded wireless Internet of Things (IoT) device that communicates wirelessly with other devices over a machine-to-machine (M2M) interface, such as a Machine Type Communication (MTC) interface and/or another type of M2M interface. For example, UE device 110 may be electrically coupled to any electronic device with a microcontroller, such as a microcontroller controlling one or more actuators, a microcontroller controlling one or more sensors, a microcontroller that performs data processing, and/or another type of electronic device with a microcontroller. Examples of such devices may include a parking or road sensor (e.g., a magnetic vehicle detector, a motion sensor, a force or load sensor, a vibration sensor, etc.), a utility meter or monitor (e.g., an electricity sensor, a water sensor, a gas sensor, etc.), a weather sensor (e.g., a temperature sensor, a humidity sensor, a barometric pressure sensor, a wind sensor, a light sensor, etc.), a smart city sensor (e.g., a building vibration sensor, a noise level sensor, an electromagnetic field sensor, a traffic congestion level sensor, a traffic light sensor, a lighting level sensor, a waste container fill level sensor, an air pollution level sensor, etc.), a device associated with a security system (e.g., a camera, a motion sensor, a door sensor, a window sensor, etc.), a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a power system (e.g., a smart grid monitoring device, etc.), a device controlling a financial transaction system (e.g., a point-of-sale terminal, a vending machine, etc.), and/or another type of electronic device.

In yet other implementations, UE device 110 may correspond to an unmanned aerial vehicle or an unmanned aircraft system that communicates wirelessly with other devices over an M2M interface using MTC and/or another type of M2M communication. Examples of such airborne MTC devices include consumer drone devices used for entertainment, photo or video capture, payload delivery, and/or other uses; commercial delivery drones used to deliver packages to customers; law enforcement drones used for intelligence gathering operations; and/or other types of drones, aerostats, or other aerial devices.

Wireless access network 120 may provide access to packet data network 140 for wireless devices, such as UE devices 110, via a base station 125 and a packet data network (PDN) access device 130. While FIG. 1 illustrates a single base station 125 and a single PDN access device 130 for illustrative purposes, in practice, wireless access network 120 may include multiple, and possibly a large number of, base stations 125 and/or PDN access devices 130.

Wireless access network 120 may enable UE devices 110 to connect to packet data network 140 for mobile telephone service, Short Message Service (SMS) message service, Multimedia Message Service (MMS) message service, Internet access, cloud computing, and/or other types of data services. Wireless access network 120 may establish a packet data network connection between UE device 110 and packet data network 140 via one or more Access Point Names (APNs). For example, wireless access network 120 may establish an Internet Protocol (IP) connection between UE device 110 and packet data network 140.

In some implementations, wireless access network 120 may include a Long Term Evolution (LTE) access network (e.g., an evolved packet core (EPC) network). In other implementations, wireless access network 120 may include a Code Division Multiple Access (CDMA) access network. For example, the CDMA access network may include a CDMA enhanced High Rate Packet Data (eHRPD) network (which may provide access to an LTE access network).

Furthermore, wireless access network 120 may include an LTE Advanced (LTE-A) access network and/or a Fifth Generation (5G) access network or other advanced network that includes 5G New Radio (NR) air interface functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Base station 125 may include and/or be associated with one or more cells that include devices and/or components configured to enable wireless communication with UE devices 110. For example, each cell may include and/or be associated with a radio frequency (RF) transceiver facing a particular direction. PDN access device 130 may function as a gateway to packet data network 140 and/or another network (not shown in FIG. 1) reachable through packet data network 140. For example, a particular PDN access device 130 may be associated with a particular APN and UE device 110 may connect to the particular APN by connecting to the particular PDN access device 130. If wireless access network 120 corresponds to a Fourth Generation (4G) LTE network, PDN access device 130 may include a PDN Gateway (PGW) device. If wireless access network corresponds to a Fifth Generation (5G) network, PDN access device 130 may include a User Plane Function (UPF) node device.

PDN access device 130 may maintain an anchor point for UE device 110 mobility, perform packet routing and forwarding, perform the user plane part of policy rule enforcement, perform packet inspection, perform lawful intercept, perform traffic usage reporting, perform Quality of Service (QoS) handling in the user plane, perform uplink traffic verification, perform transport level packet marking, perform downlink packet buffering, and/or perform other types of functions associated with a PDN access. Furthermore, in some implementations, PDN access device 130 may implement splitting of a transport protocol connection. The split transport protocol connection may enable PDN access device 130 to perform pacing of the send rate of a data flow by application server 160 to UE device 110 by setting the size of a send control buffer associated with the data flow.

Packet data network 140 may include, or be coupled to, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Packet data network 140 may allow the delivery of Internet Protocol (IP) services to UE devices 110, and may interface with other external networks. Packet data network 140 may include one or more server devices and/or network devices, or other types of computation or communication devices. In some implementations, packet data network 140 may include an Internet Protocol Multimedia Sub-system (IMS) network (not shown in FIG. 1). An IMS network may include a network for delivering IP multimedia services and may provide media flows between UE device 110 and external IP networks or external circuit-switched networks (not shown in FIG. 1). Packet data network 140 may include a performance enhancement system 150.

Performance enhancement system 150 may include one or more devices, such as computer devices, network device, and/or server devices, which enhance performance of packet data network 140 and/or devices communicating via packet data network 140. For example, performance enhancement system 150 may include a performance enhancing proxy (PEP) middlebox device that splits a transport protocol connection (e.g., splits a TCP connection, splits a UDP connection, splits a QUIC connection, etc.) between a server and a client into two separate connections: a first transport protocol connection from application server 160 to performance enhancement system 150 and a second transport protocol connection from performance enhancement system 150 to UE device 110.

The split transport protocol connection may enable the PEP middlebox device to perform congestion avoidance, transport protocol splitting, acknowledgement filtering and/or decimation, protocol spoofing, load balancing, and/or other types of processes to improve the end-to-end performance of particular communication protocols. Furthermore, in some implementations, performance enhancement system 150 may implement pacing of the send rate of a data flow by application server 160 to UE device 110 by setting the size of a send control buffer associated with the data flow.

Application server 160 may include one or more devices, such as computer devices and/or server devices, which send downlink data to UE device 110 and/or receive uplink data from UE device 110. For example, application server 160 may function as a content provider that streams video and/or audio to UE device 110, provide application data in response to requests from UE device 110, perform cloud computing for UE device 110, send control instructions to UE device 110, and/or perform other types of application server function that include sending downlink data to UE device 110. Application server 160 may pace the flow of the downlink data to UE device 110 based on the size of a send buffer associated with a network device that handles the flow of data from application server 160 to UE device 110, such as performance enhancement system 150, PDN access device 130, base station 125, and/or another type of network device.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
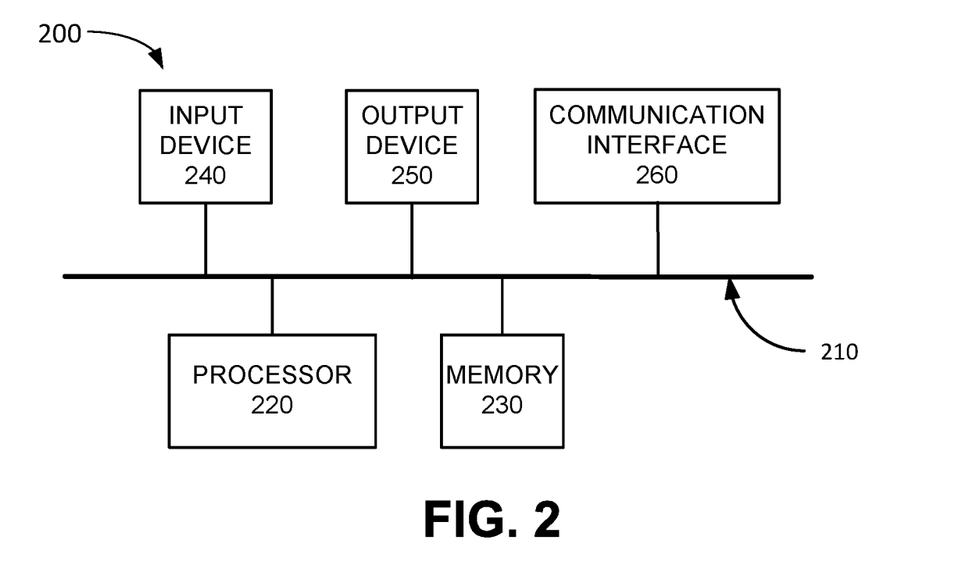
FIG. 2 is a diagram illustrating exemplary components of a device that may be included in a device of FIG. 1.

FIG. 2 is a diagram illustrating example components of a device 200 according to an implementation described herein. UE device 110, base station 125, PDN access device 130, performance enhancement system 150, and/or application server 160 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to setting the size of a send buffer to pace the flow of data from a sending device to a receiving device. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
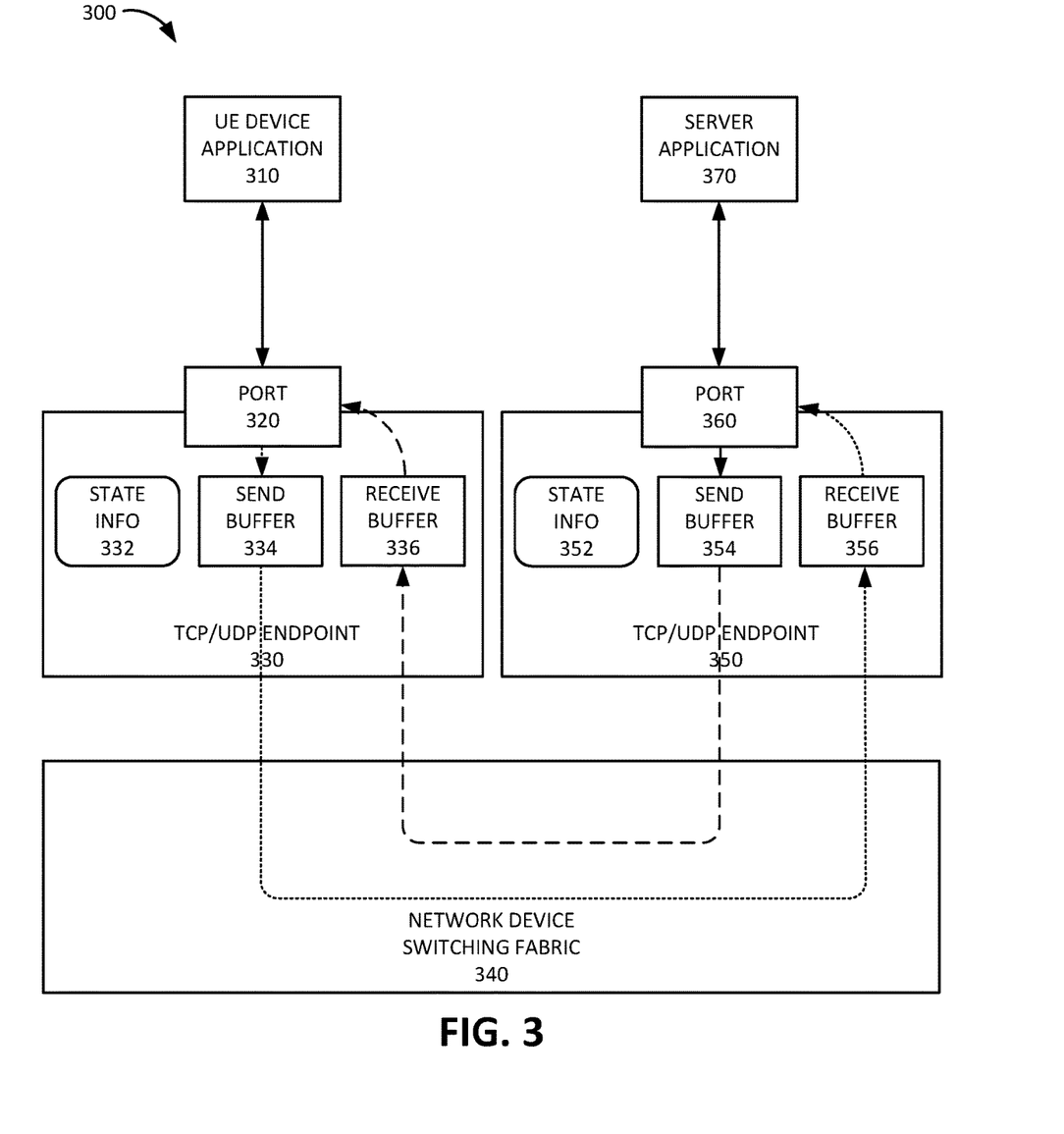
FIG. 3 is a diagram of an exemplary socket configuration according to an implementation described herein.

FIG. 3 is a diagram of an exemplary socket configuration 300 according to an implementation described herein. Socket configuration 300 illustrates the operation of send and receive sockets for a split transport protocol data flow connection. Thus, socket configuration 300 resides in a network device that splits a transport protocol data flow between UE device 110 and application server 160. As shown in FIG. 3, socket configuration 300 may include a UE device application 310, a first TCP/UDP endpoint 330, a network device switching fabric 340, a second TCP/UDP endpoint 350, and a server application 370.

UE device application 310 may reside on UE device 110 and may request data from server application 370, which resides on application server 160. For example, UE device application 310 may correspond to a media player application that requests video content from server application 370. Server application 370 may, in response to receiving the request, stream the requested video content to UE device application 310.

First TCP/UDP endpoint 330 may correspond to a TCP/UDP socket that resides in the kernel space of a network device that processes a first transport protocol data flow between UE device 110 and a network device. For example, first TCP/UDP endpoint 330 may correspond to a network device in a network path between UE device 110 and another network device that includes second TCP/UDP endpoint 350. First TCP/UDP endpoint 330 may terminate a TCP or UDP connection from UE device application 310 via port 320. The memory space of the socket corresponding to first TCP/UDP endpoint 330 may include a state information (info) component 332, a send buffer 334, and a receive buffer 336. State info component 332 may store the state information for the socket. Send buffer 334 may store packets that are to be sent to a destination device associated with the socket. Receive buffer 336 may store packets received from a source device associated with the socket.

Second TCP/UDP endpoint 350 may correspond to a TCP/UDP socket that resides in the kernel space of a network device that processes a second transport protocol data flow between application server 160 and the network device. For example, second TCP/UDP endpoint 350 may reside in performance enhancement system 150, in PDN access device 130, and/or in another type of network device in a network path between application server 160 and the network device that includes first TCP/UDP endpoint 330.

Second TCP/UDP endpoint 350 may terminate a TCP or UDP connection from server application 370 to the network device via port 360. The memory space of the socket corresponding to second TCP/UDP endpoint 350 may include a state info component 352, a send buffer 354, and a receive buffer 356. State info component 352 may store the state information for the socket. Send buffer 354 may store packets that are to be sent to a destination device associated with the socket. Receive buffer 356 may store packets received from a source device associated with the socket.

TCP/UDP endpoint 330 may receive packets from UE device application 310, store the packets in send buffer 334, and forward the packets from send buffer 334 to TCP/UDP endpoint 350 via network device switching fabric 340. TCP/UDP endpoint 350 may receive the packets and store the packets in receive buffer 356 before forwarding the packets to server application 370. Similarly, TCP/UDP endpoint 350 may receive packets from server application 370, store the packets in send buffer 354, and forward the packets from send b354 to TCP/UDP endpoint 330 via network device switching fabric 340. TCP/UDP endpoint 330 may receive the packets and store the packets in receive buffer 336 before forwarding the packets to UE device application 310. TCP/UDP endpoint 350 may control the pace of packet flow from server application 370 to TCP/UDP endpoint 350 by setting the maximum size of send buffer 354 to a value that is based on a determined target send rate and a determined round trip time for packets from server application 370 to UE device application 310.

Although FIG. 3 shows exemplary components of socket configuration 300, in other implementations, socket configuration 300 may include fewer components, different components, additional components, or differently arranged components than depicted in FIG. 3. Additionally or alternatively, one or more components of socket configuration 300 may perform one or more tasks described as being performed by one or more other components of socket configuration 300.

Figure 4:
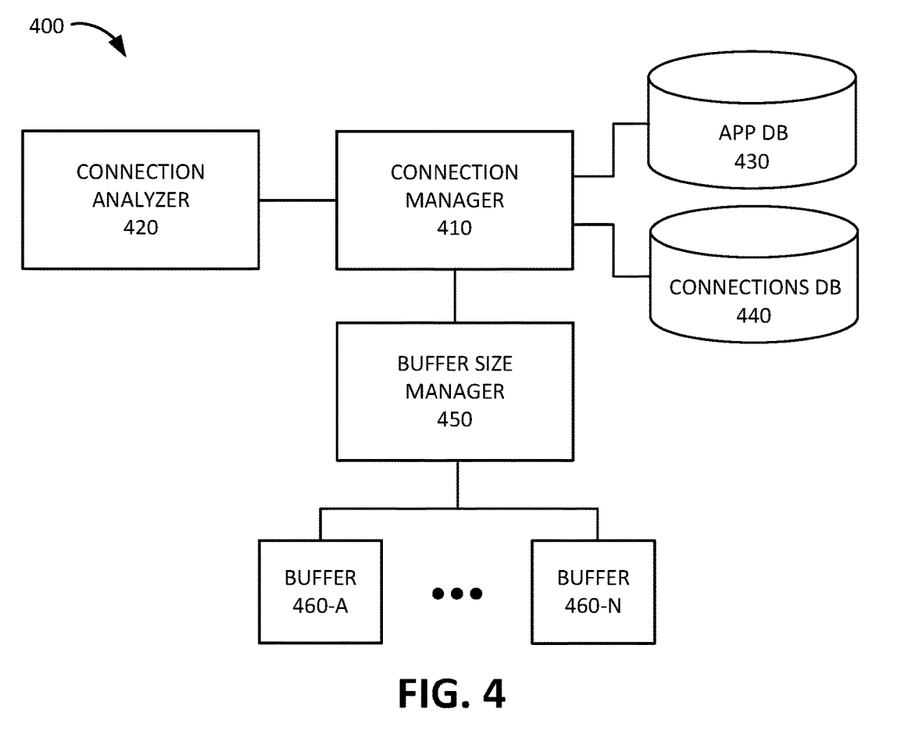
FIG. 4 is a diagram illustrating exemplary functional components of a network device that may be included in a device of FIG. 1.

FIG. 4 is a diagram illustrating exemplary functional components of a network device 400 that may be included in a device of FIG. 1. In some implementations, network device 400 may be included in performance enhancement system 150. In other implementations, network device 400 may be included in PDN access device 130. In yet other implementations, network device 400 may be included in a different device of FIG. 1, such as, for example, base station 125. The functional components of network device 400 may be implemented, for example, via processor 220 executing instructions from memory 230. Alternatively, some or all of the functional components included in network device 400 may be implemented via hard-wired circuitry. As shown in FIG. 4, network device 400 may include a connection manager 410, a connection analyzer 420, an application (app) DB 430, a connections DB 440, a buffer size manager 450, and buffers 460-A to 460-N (referred to collectively as "buffers 460" and individually as "buffer 460").

Connection manager 410 may manage connections associated with the network device 400. For example, connection manager 400 may obtain connection information associated with a particular connection. Connection analyzer 420 may provide information relating to the connection to connection manager 410. For example, connection analyzer 420 may identify an application and/or application type associated with a particular connection. Furthermore, connection analyzer 420 may determine a round trip time for the particular connection.

App DB 430 may store information relating to particular applications and/or application types. For each particular application and/or application type, app DB 430 may store a target sending rate for the particular application and/or application type. The target sending rate may be based on the QoS requirements, latency requirements, throughput requirements, and/or other types of requirements associated with the particular application and/or application type. Information obtained from connection analyzer 420 may be stored in connections DB 440 by connections manager 410. Thus, connections DB 440 may store information relating to particular connections managed by network device 400. Exemplary information that may be stored in connections DB 440 is described below with reference to FIG. 5.

Connection manager 410 may instruct buffer size manager 450 to set a send buffer size for the particular connection based on information stored in connections DB 440. Buffer size manager 450 may set the size of buffer 460 based on the instructions received from connection manager 410. Each buffer 460 may be associated with a particular connection. For example, each buffer 460 may correspond to a send buffer 354 associated with a particular connection from server application 370 to UE device application 310 for a particular UE device 110.

Although FIG. 4 shows exemplary components of network device 400, in other implementations, network device 400 may include fewer components, different components, additional components, or differently arranged components than depicted in FIG. 4. Additionally or alternatively, one or more components of network device 400 may perform one or more tasks described as being performed by one or more other components of network device 400.

Figure 5:
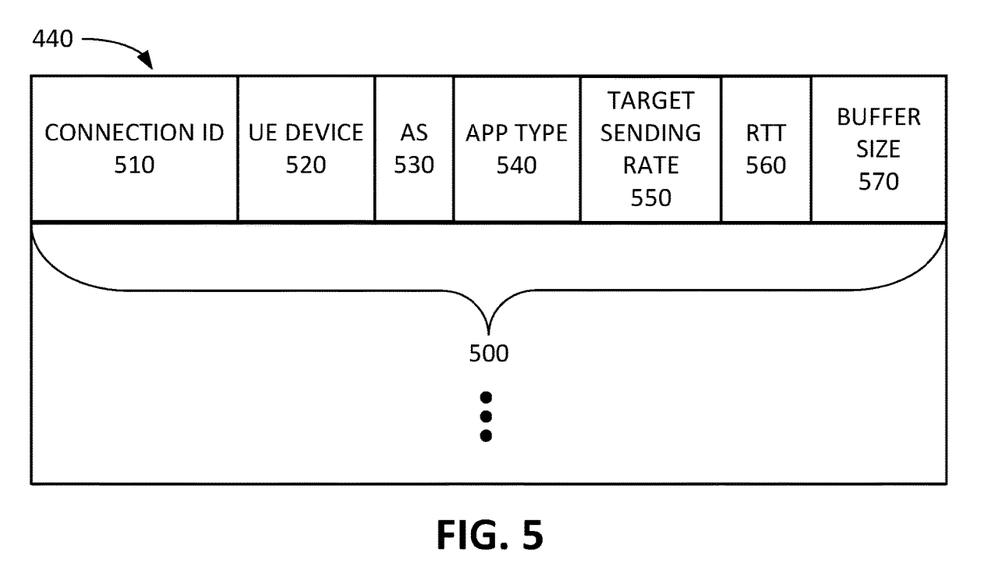
FIG. 5 is a diagram illustrating exemplary components of the connections database of FIG. 4.

FIG. 5 is a diagram illustrating exemplary components of the connections DB 440. As shown in FIG. 5, connections DB 440 may include one or more connection records 500. Each connection record 500 may store information relating to a particular connection associated with a data flow managed by device 400. Connection record 50 may include a connection identifier (ID) field 510, a UE device field 520, an application server (AS) field 530, an application (app) type field 540, a target sending rate field 550, a round trip time (RTT) field 560, and a buffer size field 570.

Connection ID field 510 may store a connection ID that uniquely identifies a particular connection. For example, the connection ID field 510 may store the IP address and port for the source device and the destination device associated with the connection. Additionally or alternatively, connection ID field 510 may store an ID assigned to a TCP and/or UDP session by network device 400. Furthermore, connection ID field 510 may store information identifying the type of transport protocol associated with the particular connection, such as TCP, UDP, QUIC, and/or another type of transport protocol.

UE device field 520 may store information identifying a particular UE device 110 associated with the particular connection. For example, UE device field 520 may store a Media Access Control (MAC) address, an Internet Protocol (IP) address, a Session Initiation Protocol (SIP) address, a Mobile Station International Subscriber Directory Number (MSISDN), an International Mobile Subscriber Identity (IMSI) number, a Mobile Directory Number (MDN), and/or by another type of ID associated with the particular UE device 110. AS field 530 may store information identifying a particular application server 160 associated with the particular connection. For example, AS field 530 may store a MAC address, an IP address, a SIP address, an APN, and/or by another type of ID associated with the particular application server 160.

App type field 540 may store information identifying an application type associated with the particular connection. For example, app type field 540 may identity a video streaming application, a live video streaming application, a video downloading application, a Voice over IP (VoIP) application, an audio streaming application, an audio downloading application, a real-time gaming application, a high priority data application, am ultra-reliable low-latency communication application, a best effort data application, and/or another type of application. Additionally or alternatively, app type field 540 may store information identifying particular criteria associated with the particular application, such as a QoS class, a latency requirement, a throughput requirement, and/or another type of criterion.

Target sending rate field 550 may store information identifying the target sending rate determined for the particular connection. The target sending rate may be determined, for example, based on the application type associated with the particular connection and based on the information stored in app DB 430. RTT field 560 may store information identifying the round trip time determined for the particular connection. If the particular connection corresponds to a TCP connection, the round trip time may be determined based on an RTT counter associated with the TCP connection. If the particular connection corresponds to a UDP connection or a QUIC connection, the round trip time may be determined by estimating the round trip time using a request response cycle. Buffer size field 570 may store information identifying the maximum size of the send buffer for the particular connection determined by buffer size manager 450.

Although FIG. 5 shows exemplary components of connections DB 440, in other implementations, connections DB 440 may include fewer components, different components, additional components, or differently arranged components than depicted in FIG. 5. For example, in some implementations, connections DB 440 may store information relating to base stations 125 and average round trip times associated with particular base stations 125 for different conditions. For example, for each base station 125, connections DB 440 may store a default average round trip time and/or an average round trip time for a particular time of day, day of week, reported network condition, reported air interface condition, reported number of users, and/or another type of condition. Connection manager 410 may use the average round trip time associated with a particular base station 125, that is associated with UE device 110, as an estimated round trip time for determining the send buffer size.

Figure 6:
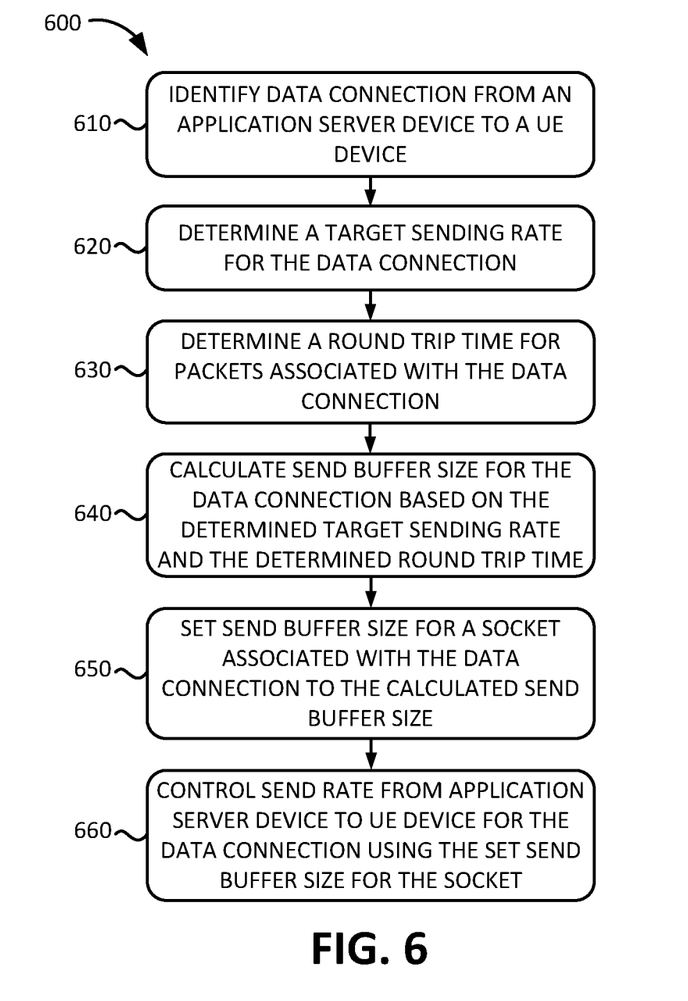
FIG. 6 is a flowchart of a process for setting a send buffer size according to an implementation described herein.

FIG. 6 is a flowchart 600 of a process for setting a send buffer size according to an implementation described herein. In some implementations, the process of FIG. 6 may be performed by performance enhancement system 150. In other implementations, some or all of the process of FIG. 6 may be performed by another device or a group of devices separate from performance enhancement system 150, such as PDN access device 130 and/or one or more other components of wireless access network 120.

The process of FIG. 6 may include identifying a data connection from application server 160 to UE device 110 (block 610). For example, performance enhancement system 150 may detect a new connection at a port from application server 160 to a particular UE device 110. In response, performance enhancement system 150 may initiate a process to pace the sending of packets from application server 160 via the detected new connection.

A target sending rate may be determined for the data connection (block 620). For example, performance enhancement system 150 may determine an application type associated with the connection and then determine a target sending rage for the application type based on the information stored in app DB 430. The application type may be determined based on information included in the packets associated with the connection. For example, connection analyzer 420 may retrieve an application header from a packet associated with the connection and determine the application type based on information (e.g., an application ID, etc.) stored in the retrieved application header.

A round trip time for packets associated with the data connection may be determined (block 630). For example, performance enhancement system 150 may determine a transport protocol associated with the connection and determine the round trip time using a method based on the determined transport protocol. If the particular connection corresponds to a TCP connection, the round trip time may be determined based on an RTT counter attached to the TCP socket structure (e.g., Linux struct tcp_sock, etc.) associated with the TCP connection and/or based on a different timer that compares a timestamp of a sent packet with a timestamp for an ACK received for the packet (e.g., identified based on a sequence number). If the particular connection corresponds to a UDP connection or a QUIC connection, the round trip time may be determined by estimating the round trip time using a request response cycle. For example, connection analyzer 420 may identify a request packet associated with the UDP/QUIC connection, determine a first timestamp for the request packet, determine a response packet associated with the identified request packet, determine a second timestamp for the response packet, and determine the round trip time as the different between the first timestamp and the second timestamp. The request and response packets may be identified based on application headers retrieved from the packets, for example.

In some implementations, such as for simplex UDP traffic that corresponds to one-way traffic with no return traffic, the round trip time may be estimated based on a determined average round trip time. For example, connection manager 410 may retrieve, from connections DB 440, an average round trip time for base station 125 associated with UE device 110. The retrieved average round trip time may be based on a default average round trip time for base station 125, for wireless access network 120, and/or for packet data network 140; may be based on a particular condition associated with base station 125, wireless access network 120, and/or packet data network 140; and/or may be based on a different criterion. The particular condition may include a particular time of day, day of week, reported network condition, reported air interface condition, reported number of users, and/or another type of condition.

A send buffer size may be calculated for the data connection based on the determined target sending rate and the determined round trip time (block 640) and the send buffer size for a socket associated with the data connection may be set based on the calculated send buffer size (block 650). For example, the send buffer size may be computed using the following equation:

$$S = R*RTT*(1+\alpha) \qquad \text{Eq. (1)}$$

where S corresponds to the send buffer size, R corresponds to the target sending rate, RTT corresponds to the round trip time, and α corresponds to a safety factor for the RTT estimation. Eq. (1) may thus be related to a bandwidth delay product (BDP) and S may represent the amount of data that is "in flight" or on the physical link of the network connection during a particular time and not yet delivered to the recipient. The use of the safety factor α may be necessary because the round trip time may vary as a result of the wireless connection to UE device 110, since the radio conditions of the wireless connection may change over time. Thus, the determined round trip time may underestimate the send buffer size and underestimating the send buffer size may cause throughput collapse. The value for α may be empirically determined (e.g., a value that does not result in a throughput collapse). In some implementations, a default value of 0.25 may be selected for α. In other implementations, a different default value may be selected.

In some implementations, TCP/UDP endpoint 350 of performance enhancement system 150 (and/or a different implementation of network device 400) may correspond to a Linux kernel socket. The send buffer size of the Linux kernel socket may be controlled by the following variables:

net.ipv4.tcp_wmem=<min, default, max>#for TCP socket
net.ipv4.udp_wmem=<min, default, max>#for UDP socket if the socket corresponds to an IP version 4 (IPv4) socket. IP version 6 (IPv6) may reuse the same variables as IPv4 sockets. Although each socket may have its own allocated buffer space, the size of the send buffer of the socket is determined based on these two variables when the socket is created. The send buffer size S for a socket sk may be set with the following command:

setsockopt(sk,SOL_SOCKET,SO_SNDBUFF,(void*), &s,sizeof(S))

where SOL_SOCKET and SO_SNDBUFF are socket options defined in Linux Kernel.

The send rate from application server 160 to UE device 110 for the data connection may be controlled using the set send buffer size for the socket (block 660). For example, if application server 160 continues to send application data via the connection at a rate that is higher than the send buffer is able to handle, the send buffer will become full. If the send buffer becomes full, performance enhancement system 150 may respond, in an acknowledgement packet back to application server 160, to reduce the window size of the connection. The window size determines the number of bytes that may be sent by the sender before an acknowledgement is received from the receiver. Thus, if the window size is reduced, application server 160 may reduce the send rate of the data flow. Reducing the send rate of the data flow may in turn result in fewer retransmissions that may otherwise result if base station 125 becomes congested.

Figure 7:
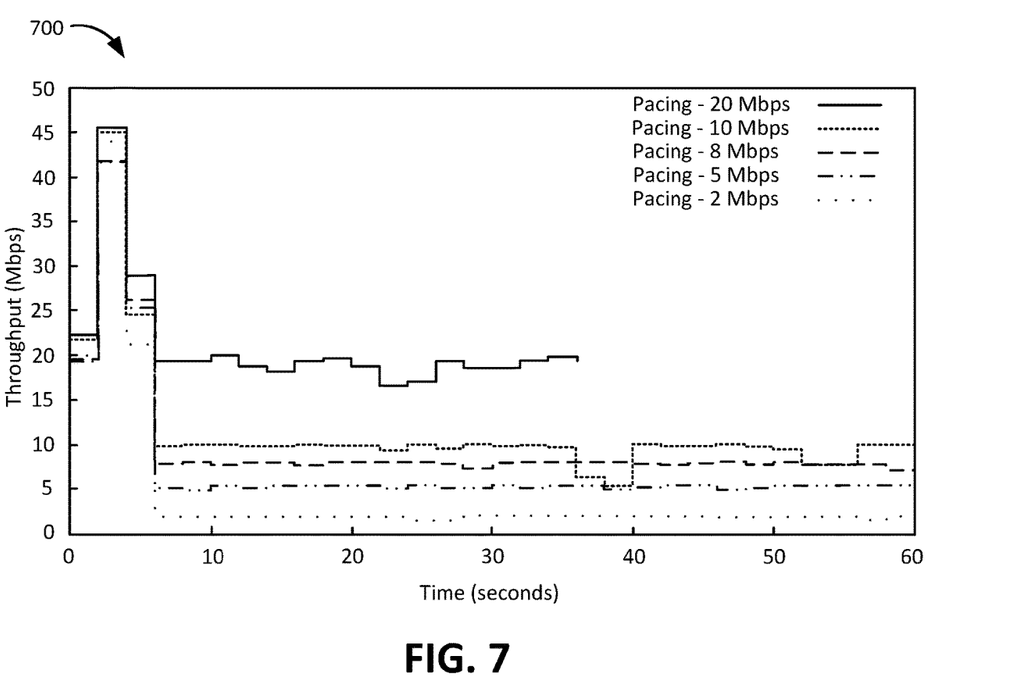
FIG. 7 depicts a graph that illustrates pacing results based on send buffer size settings according to an implementation described herein.

FIG. 7 is a diagram of a graph 700 that illustrates pacing results based on send buffer size settings according to an implementation described herein. Graph 700 illustrates the downloading of a 100 Megabytes (MB) file from a Linux server. The safety factor α has been set to 0 to show how accurately the send rate may be controlled by setting the send buffer size. After an initial burst of 20 MB of data, the socket size of the send buffer was reduced to pace the flow of the data to a rate R. Thus, the first 20 MB of the data transfer was not paced and graph 700 shows the default behavior for the 20 MB, which occurs within the first 5 seconds. Graph 700 shows the results for rate R set to 2 Megabits per second (Mbps), set to 5 Mbps, set to 8 Mbps, set to 10 Mbps, and set to 20 Mbps. As can be seen in graph 700, the data flow may be effectively paced to a desired target rate (which may be set as low as 2 Mbps), by setting the size of the send buffer.

Figure 8:
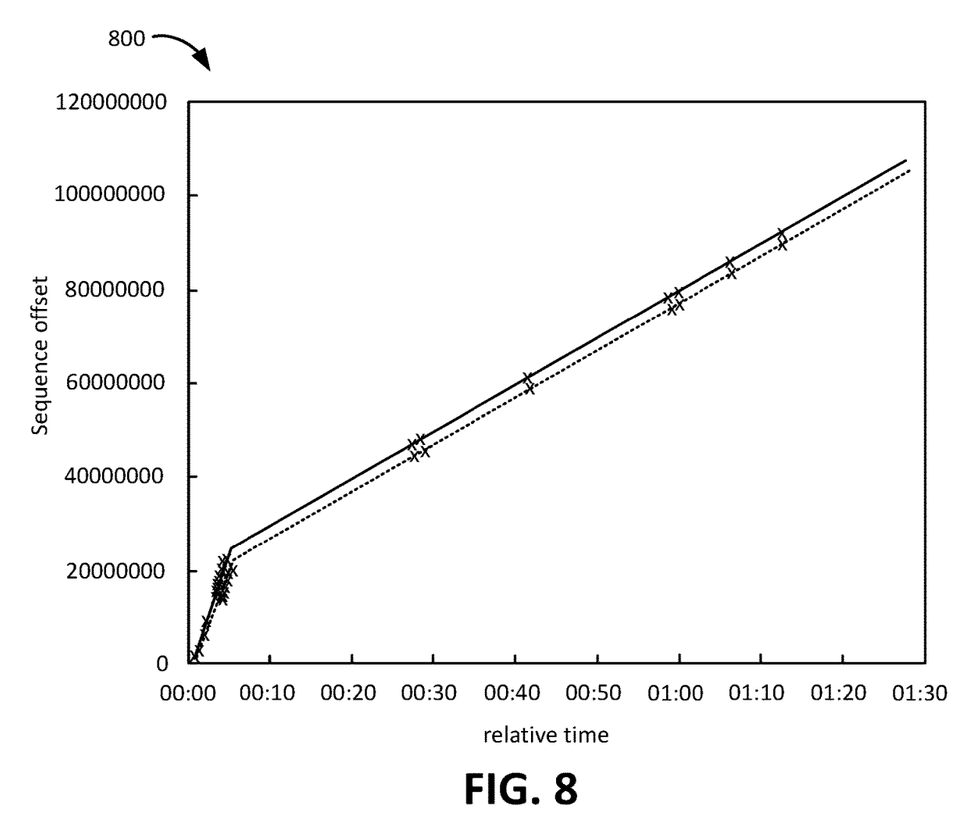
FIG. 8 depicts a graph that illustrates sequence offsets based on send buffer size settings according to an implementation described herein.

FIG. 8 is a diagram of a graph 800 that illustrates sequence offsets based on send buffer size settings according to an implementation described herein. Graph 800 illustrates a TCPtrace sequence graph for a send buffer size set to 8 Mbps. As seen in graph 800, packet retransmission occurs during the initial burst of data transfer, before the send buffer size is reduced to pace the flow of the data to 8 Mbps. In some implementations, 8 Mbps may correspond to an empirically determined pacing rate for a heavily congested area (e.g., a heavily congested base station 125). As further seen in graph 800, after the pacing is activated, only occasional retransmission of packets occurs, because the pacing results in few packets being dropped further down the network path in the congested portion of the network path.

Figure 9:
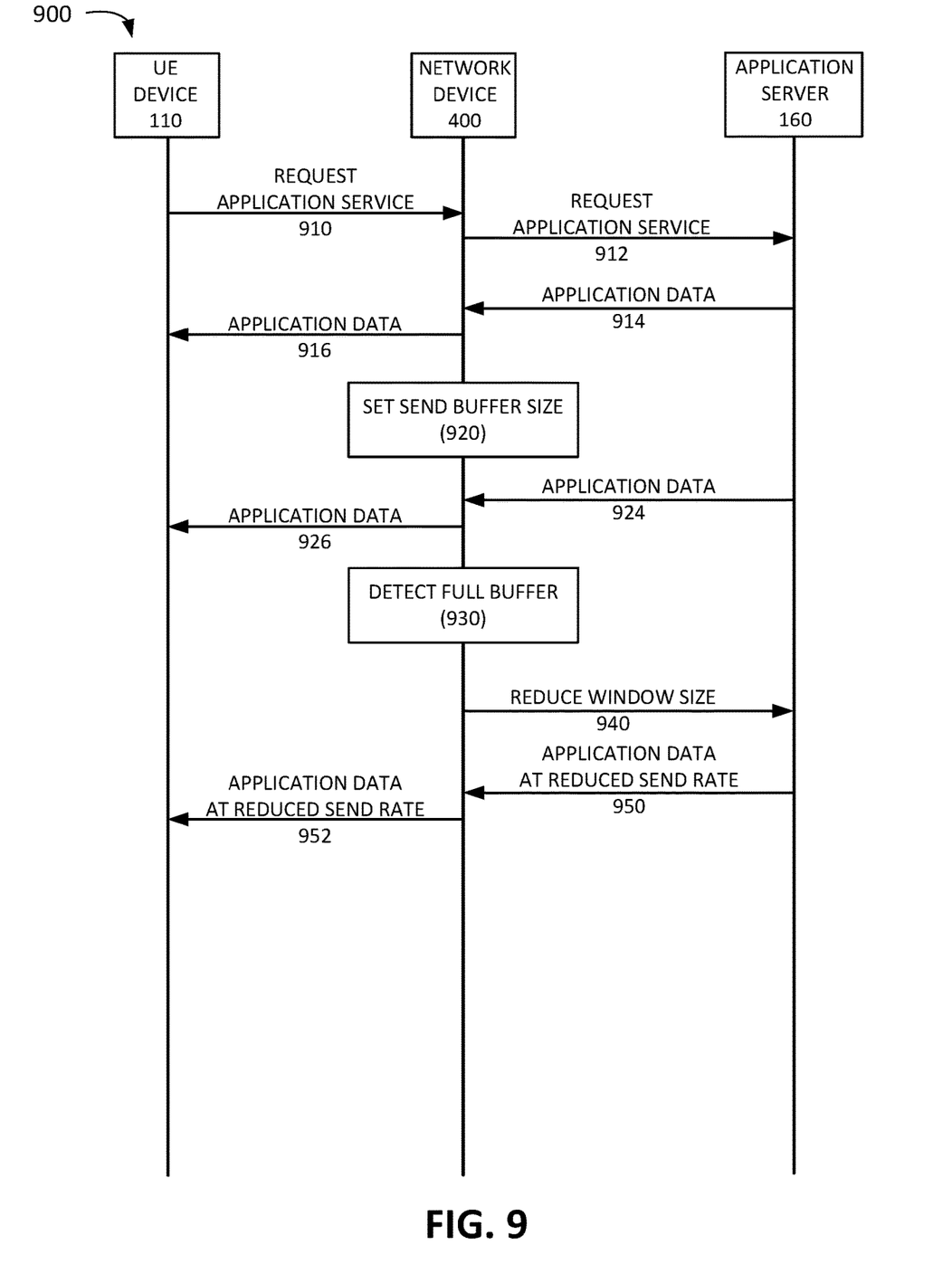
FIG. 9 is an exemplary signal flow of processing an application data flow by setting a send buffer size according to an implementation described herein.

FIG. 9 is an exemplary signal flow 900 of processing an application data flow by setting a send buffer size according to an implementation described herein. As shown in FIG. 9, signal flow 900 may include UE device 110 requesting an application service from application server 160 via network device 400 (signal flows 910 and 912). For example, UE device 110 may request to stream video from application server 160. In some implementations, network device 400 may correspond to performance enhancement system 150. In other implementations, network device 400 may correspond to PDN access device 130 (e.g, a PGW, a UPF, etc.). In yet other implementations, network device 400 may correspond to another type of network device in the network path between UE device 110 and application server 160 (e.g., a serving gateway (SGW), a switch, a router, a firewall, a Network Address Translation (NAT) device, etc.).

Application server 160 may respond to the request by sending the requested application data to UE device 110 via network device 400 (signals 914 and 916). Network device 400 may set the send buffer size for the send buffer of the socket associated with the application data connection from application server 160 to UE device 110 based on the target sending rate (e.g., a target sending rate for streaming video, etc.) and based on the determined round trip time for packets sent from application server 160 to UE device 110 and for acknowledgement packets sent by UE device 110 back to application server 160 (block 920).

Application server 160 may continue to send application data to UE device 110 via network device 400 (signals 924 and 926) at a rate that is faster than the send buffer, based on the set maximum size, is able to handle. As a result, the send buffer may become full and network device 400 may detect the full send buffer (block 930). In response, network device 400 may instruct application server 160 to reduce the window size for the application data flow (signal 940). In response, application server 160 may reduce the window size and may send application data at a reduced send rate as a result of the smaller window size (signal 950). Therefore, the send rate to UE device 110 via network device 400 may be reduced (signal 952).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 6, and series of signal flows have been described with respect to FIG. 9, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    determining, by a computer device, a send buffer size value for a data connection from an application server device to a user equipment (UE) device, wherein the data connection includes a first transport layer network protocol connection between the application server device and the computer device and a second transport layer network protocol connection between the computer device and the UE device;
    setting, by the computer device, a send buffer size for a socket associated with the data connection based on the determined send buffer size value, wherein the socket terminates the first transport layer network protocol connection; and
    controlling, by the computer device, a send rate from the application server device to the UE device for the data connection using the set send buffer size for the socket.

2. The method of claim 1, further comprising:
    determining an application type associated with the data connection; and
    determining a target sending rate for the data connection based on the determined application type, wherein determining the send buffer size for the data connection is based on the determined target sending rate.

3. The method of claim 1, further comprising:
    determining the send buffer size for the data connection by determining a round-trip time for packets associated with the data connection.

4. The method of claim 3, wherein the data connection uses a Transmission Control Protocol (TCP) data flow, and wherein determining the round-trip time for the packets associated with the data connection includes:
    accessing a round-trip time counter for a TCP socket associated with the data connection.

5. The method of claim 3, wherein the data connection uses a User Datagram Protocol (UDP) data flow, and wherein determining the round-trip time for the packets associated with the data connection includes at least one of:
    estimating the round-trip time by comparing a first timestamp associated with a request message sent via the data connection with a second timestamp associated with a response message to the request message; or
    estimating the round-trip time based on an average round-trip time determined using a history of data connections for a base station associated with the UE device.

6. The method of claim 3, wherein determining the send buffer size for the data connection includes:
    adding a safety factor to the round-trip time.

7. The method of claim 1, wherein the socket associated with the data connection includes a Linux kernel socket.

8. The method of claim 1, wherein the computer device includes a performance enhancement device associated with a provider that manages a network associated with the data connection.

9. The method of claim 8, wherein the network corresponds to a wireless access network that communicates with the application server device via a packet data network, and wherein the computer device includes a packet data network gateway (PGW) device or a User Plane Function (UPF) device.

10. A computer device comprising:
    a memory configured to store instructions; and
    a processor configured to execute the instructions to:

determine a send buffer size value for a data connection from an application server device to a user equipment (UE) device, wherein the data connection includes a first transport layer network protocol connection between the application server device and the computer device and a second transport layer network protocol connection between the computer device and the UE device;

set a send buffer size for a socket associated with the data connection based on the determined send buffer size value, wherein the socket terminates the first transport layer network protocol connection; and control a send rate from the application server device to the UE device for the data connection using the set send buffer size for the socket.

11. The computer device of claim 10, wherein the processor is further configured to:

determine an application type associated with the data connection; and determine a target sending rate for the data connection based on the determined application type, wherein the processor is configured to determine the send buffer size for the data connection based on the determined target sending rate.

12. The computer device of claim 10, wherein the processor is further configured to:

determine a round-trip time for packets associated with the data connection, wherein the processor is configured to determine the send buffer size for the data connection based on the determined round-trip time.

13. The computer device of claim 12, wherein the data connection uses a Transmission Control Protocol (TCP) data flow, and wherein, when determining the round-trip time for the packets associated with the data connection, the processor is further configured to:

access a round-trip time counter for a TCP socket associated with the data connection.

14. The computer device of claim 12, wherein the data connection uses a User Datagram Protocol (UDP) data flow, and wherein, when determining the round-trip time for the packets associated with the data connection, the processor is further configured to:

estimate the round-trip time by comparing a first timestamp associated with a request message sent via the data connection with a second timestamp associated with a response message to the request message.

15. The computer device of claim 12, wherein, when determining the send buffer size for the data connection, the processor is further configured to:

add a safety factor to the round-trip time.

16. The computer device of claim 10, wherein the socket associated with the data connection includes a Linux kernel socket.

17. A non-transitory computer-readable memory device storing instructions executable by a processor of a computer device, the non-transitory computer-readable memory device comprising:

one or more instructions to determine a send buffer size value for a data connection from an application server device to a user equipment (UE) device, wherein the data connection includes a first transport layer network protocol connection between the application server device and the computer device and a second transport layer network protocol connection between the computer device and the UE device;

one or more instructions to set a send buffer size for a socket associated with the data connection based on the determined send buffer size value, wherein the socket terminates the first transport layer network protocol connection; and one or more instructions to control a send rate from the application server device to the UE device for the data connection using the set send buffer size for the socket.

18. The non-transitory computer-readable memory device of claim 17, further comprising:

one or more instructions to determine an application type associated with the data connection; and one or more instructions to determine a target sending rate for the data connection based on the determined application type, wherein the one or more instructions to set the send buffer size include one or more instructions to set the send buffer size based on the determined target sending rate.

19. The non-transitory computer-readable memory device of claim 17, wherein the data connection uses a Transmission Control Protocol (TCP) data flow, the non-transitory computer-readable memory device further comprising:

one or more instructions to determine a round-trip time for packets associated with the data connection by accessing a round-trip time counter for a TCP socket associated with the data connection, and wherein the one or more instructions to set the send buffer size include one or more instructions to set the send buffer size based on the determined round-trip time.

20. The non-transitory computer-readable memory device of claim 17, wherein the data connection uses a User Datagram Protocol (UDP) data flow, the non-transitory computer-readable memory device further comprising:

one or more instructions to determine a round-trip time for packets associated with the data connection by comparing a first timestamp associated with a request message sent via the data connection with a second timestamp associated with a response message to the request message, and wherein the one or more instructions to set the send buffer size include one or more instructions to set the send buffer size based on the determined round-trip time.

* * * * *